Sept. 23, 1941.          J. L. HARRIS                2,257,007
                        CONTROL APPARATUS
                     Filed March 13, 1939            2 Sheets-Sheet 1
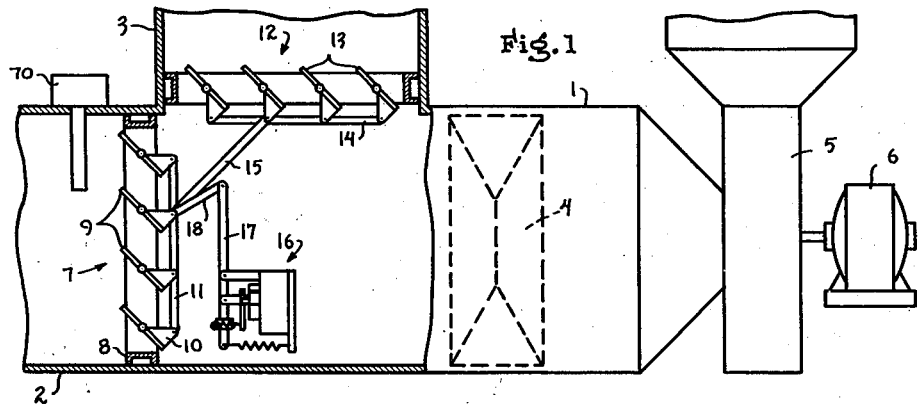
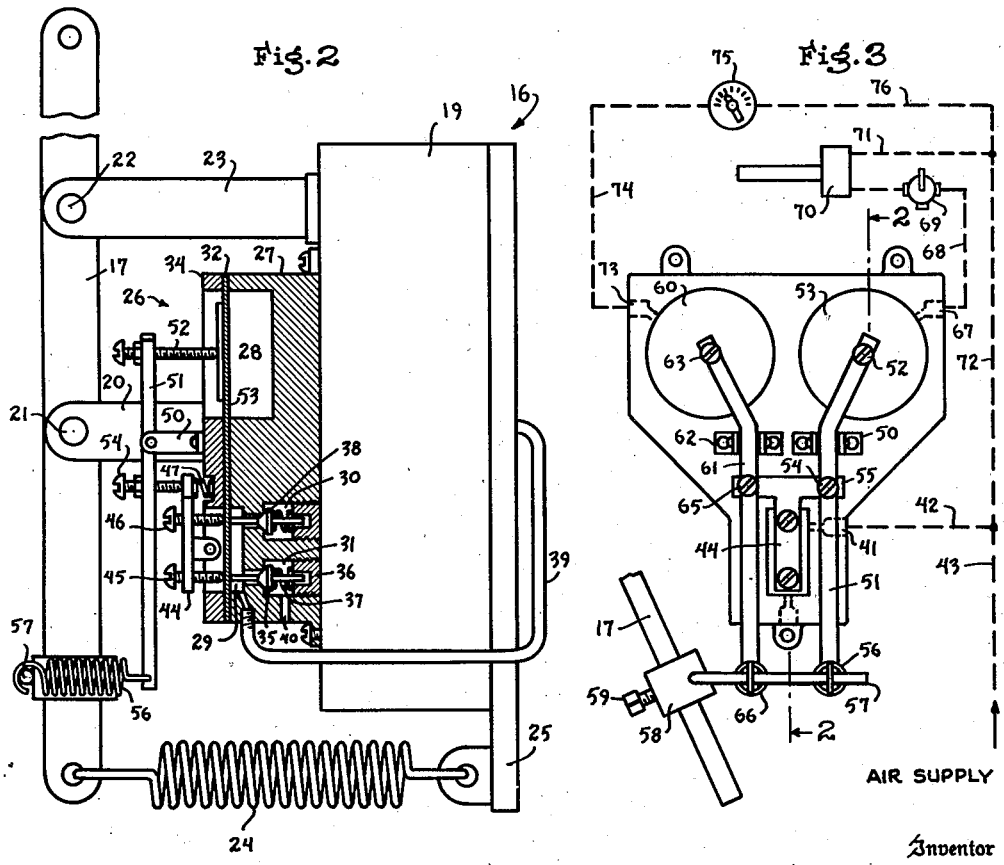
AIR SUPPLY
Inventor
John L. Harris
By George H. Fisher
Attorney Sept. 23, 1941.     J. L. HARRIS     2,257,007
CONTROL APPARATUS
Filed March 13, 1939     2 Sheets-Sheet 2
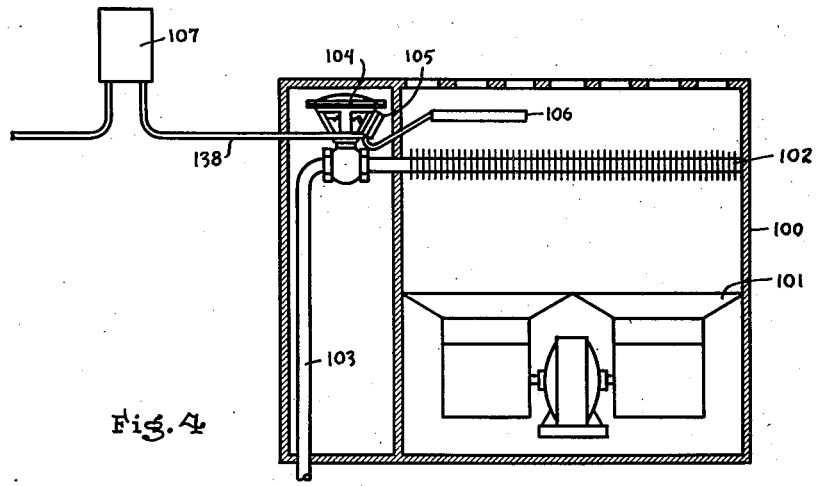
Fig. 4
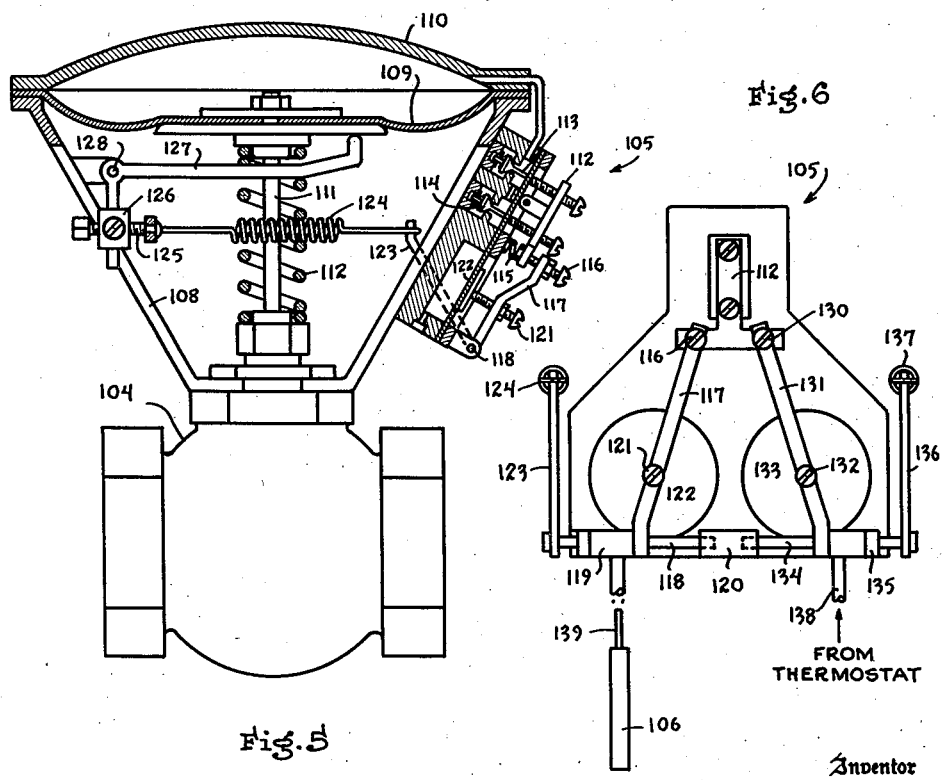
Fig. 5
Fig. 6
FROM THERMOSTAT
Inventor
John L. Harris
By George H. Fisher
Attorney Patented Sept. 23, 1941

2,257,007

UNITED STATES PATENT OFFICE 2,257,007

CONTROL APPARATUS

John L. Harris, Minneapolis, Minn., assignor to Minneapolis-Honeywell Regulator Company, Minneapolis, Minn., a corporation of Delaware Application March 13, 1939, Serial No. 261,675

12 Claims. (Cl. 236—49)

This invention relates in general to automatic controls and more particularly to pressure actuated controls for air conditioning systems.

In air conditioning practice it has become usual to provide an automatically controlled fresh air damper for controlling the amount of fresh air supplied to a conditioned space. It is desirable in most installations to provide an arrangement for preventing the automatic damper control from closing the fresh air damper completely in order to insure that enough air for proper ventilation is always supplied to the conditioned space, and for permitting ready adjustment of the minimum position from a suitable point such as a control panel. Heretofore, this result has been achieved pneumatically by providing two separate motors for the fresh air damper, one motor being controlled by the thermostat or other automatic controller and the other motor being controlled by a graduate switch on the control panel, there being a lost motion connection between the damper and the second motor so that this motor does not interfere with the control by the first motor when the damper is open beyond the minimum position. While this arrangement has generally been satisfactory, it is nevertheless relatively expensive due to the necessity of the two damper motors and the special linkage. Also this arrangement is subject to usual defect of pneumatic installations of not causing the damper position to positively assume the position demanded by its controller.

It is an object of this invention to provide a pneumatic control arrangement for a fresh air damper which provides for a remotely adjustable minimum position, which requires only a single motor for positioning the damper, which positively causes the damper to assume the exact position called for by its controller, and in which adjustment of the minimum position has no effect upon the damper position when the damper is open beyond the minimum position.

A further object of this invention is the provision of a device for positively positioning a control motor which responds independently to a plurality of conditions and which causes the motor to assume positions corresponding to the condition demanding the greatest movement in a predetermined direction.

Other objects of this invention will appear from the following description and the appended claims.

For a full disclosure of this invention reference is made to the following description and the accompanying drawings, in which Figure 1 illustrates diagrammatically an air conditioning chamber having fresh and return air dampers which are controlled by a damper motor having the improved positive positioner;

Figure 2 is a view of the damper motor and showing the positive positioner in section; being taken on line 2—2 of Figure 3;

Figure 3 shows the exterior of the positive positioner and diagrammatically indicates the various control connections;

Figure 4 diagrammatically shows a unit ventilator having a valve controlled by a positive positioner embodying the present invention;

Figure 5 is an elevation partly in section of the valve and positive positioner; and Figure 6 is an exterior view of the positive positioner.

Referring to Figure 1, reference character 1 diagrammatically illustrates an air conditioning chamber having a fresh air inlet 2 and a return air inlet 3. This chamber also includes the usual air conditioning apparatus 4 and is connected to a fan 5 which discharges conditioned air to the space being conditioned, this fan being driven by a motor 6. Located within the fresh air duct 2 is a fresh air damper 7 which consists of a damper frame 8 supporting a plurality of pivoted damper blades 9. These damper blades are each provided with a bracket 10 and the brackets are attached to an actuating member 11 so as to move the damper blades in unison. The return air duct 3 is provided with a return air damper 12 which is of the same construction as the fresh air damper 7 having a plurality of damper blades 13 which are actuated in unison by a member 14. The dampers 7 and 12 are connected together by a cross connection 15 which causes these dampers to move in unison, one closing while the other is opening and vice versa. The dampers 7 and 12 are actuated by a damper motor 16 which is of the pneumatic type and includes a lever arm 17 which is connected to one of the brackets 10 by a link 18.

Referring now to Figure 2, the damper motor 16 is of usual construction having a diaphragm casing 19 which contains the usual actuating diaphragm (not shown). This diaphragm actuates a push member 20 which is pivoted to the lever 17 at 21. The lever 17 is also pivoted at 22 to a bracket 23 which is mounted upon the diaphragm casing. The lower end of the lever 17 is connected to a biasing spring 24, the other end of this spring being connected to a bracket 25 which is secured to the diaphragm casing 19. It will be apparent that spring 24 serves to bias the lever arm 17 in the counter-clockwise direction thereby biasing the fresh air damper 7 towards closed position and the return air damper 12 towards open position. Upon application of pressure to the motor diaphragm this diaphragm will expand thus urging the member 20 towards the left which rotates the lever arm 17 in the clockwise direction against the action of spring 24 thereby moving the fresh air damper 7 towards open position and the return air damper 12 towards closed position.

The application of fluid pressure to the motor diaphragm is controlled by means of a positive positioner 26. This positive positioner includes a base portion 27 which is secured to the diaphragm casing of motor 19 and this base portion is provided with a diaphragm chamber 28, a valve chamber 29, and valve bores 30 and 31. The diaphragm chamber 28 and the valve chamber 29 are covered by a diaphragm 32, this diaphragm being held in place by means of a cover plate 34 having openings coinciding with the diaphragm chamber 28 and the valve chamber 29. The valve bore 31 communicates with the valve chamber 29 through a valve port which is normally covered by means of a valve member 35, this valve member having an actuating stem which extends through the valve port into engagement with the diaphragm 32. This valve member is also provided with a guide portion which extends into a plug 36 covering the open end of the valve bore 31, a spring 37 being provided for urging this valve member against its seat. The valve bore 30 is similarly arranged, being provided with a valve member 38. The valve chamber 29 is connected by a tube 39 to the motor diaphragm while the valve bore 31 communicates with atmosphere through a port 40. It will be apparent that when the valve member 35 is urged from its seat, air will flow from the motor diaphragm through pipe 39 into the valve chamber 29 then past valve 35 through port 40 to atmosphere. The valve 40 is therefore a vent valve for the motor diaphragm. The valve bore 30 communicates with a passage 41 (Figure 2) and this passage is in turn connected to an air supply pipe 42 leading from an air supply main 43. Thus when the valve member 38 is urged from its seat, air will flow from the supply main 43 into the valve bore 30 then past valve 38 into the valve chamber 29 from which it flows through tube 39 to the motor diaphragm. The valve member 38 is therefore an air supply valve for the damper motor.

Pivoted to the cover plate 34 is a valve lever 44 having abutment screws 45 and 46 which actuate the valve members 35 and 38 through the diaphragm 32. This valve lever 44 is provided with a biasing spring 47 which serves to bias the valve lever in the counter-clockwise direction thereby tending to hold the vent valve 35 open. The abutment screws 45 and 46 are adjusted so that when the valve lever 44 is in an intermediate or neutral position, the valves 35 and 38 will both be closed. Upon clockwise rocking of this lever the valve 38 will open while valve 35 remains closed, and upon rocking of the lever in the counter-clockwise direction from the neutral position the valve 38 will remain closed while the valve 35 will be opened.

Pivoted to a bracket 50 which is secured to the cover plate 34 is a lever 51, this lever having an abutment screw 52 which engages the portion 53 of the diaphragm covering the diaphragm chamber 32. The lever 51 is also provided with an abutment screw 54 which engages an outwardly extending portion 55 of the lever arm 44 (Figure 3). The lever arm 51 is also connected to a spring 56 which is secured at its other end to a pin 57 which is secured to the lever arm 17 by means of a collar 58, this collar being held in place by a set screw 59. It will be noted that pressure under the diaphragm portion 53 serves to rotate the lever 51 in the counter-clockwise direction while the spring 56 tends to rotate this lever in the clockwise direction. The spring 56 thus opposes the pressure acting upon the diaphragm portion 53.

The base portion 27 of the positive positioner is provided with a second diaphragm chamber which is covered by a diaphragm portion 60 located beside the diaphragm portion 53 (Figure 3). The diaphragm portion 60 actuates a lever 61 which is pivoted to a bracket 62, this lever 61 running parallel with the lever 51. This lever 61 is provided with abutment screws 63 and 65 which correspond to the abutment screws 52 and 55 of lever 51. The lever 61 is also connected to a spring 66 which is similar to the spring 56 and which is also connected to the pin 57.

The diaphragm chamber 28 is provided with a pipe connection 67 which is connected to a pipe 68 leading to a manually operated three-way valve 69 and this valve is in turn connected to a thermostat 70 which may be located in the fresh air duct 2 as shown in Figure 1. This thermostat in turn is connected by pipes 71 and 72 to the air supply main 43. It will be apparent that when the three-way valve 69 is positioned for placing thermostat 70 in control of the damper motor this thermostat will act to vary the pressure applied to the diaphragm portion 53 in accordance with variations in temperature. However, when the valve 69 is positioned for disconnecting thermostat 70 from the positive positioner, the diaphragm chamber 28 will be vented. The diaphragm chamber covered by diaphragm portion 60 is provided with a pipe connection 73 which is connected by a pipe 74 to a manually operated graduate switch 75, this switch being in effect a manually adjusted pressure regulating valve and being connected to the air supply pipe 72 by pipe 76. From the description thus far it will be apparent that the pressure applied to the diaphragm portion 53 is automatically varied by the thermostat 70 while the pressure applied to diaphragm portion 63 is manually adjusted by the graduate switch 75. The purpose of the graduate switch 75 and diaphragm portion 60 is to prevent the thermostat 70 from closing the fresh air damper 7 beyond a predetermined minimum position for thereby providing at least a minimum supply of fresh air for ventilation purposes at all times.

Assuming now that the thermostat 70 is placed in control by the three-way valve 69 and that this thermostat has caused the fresh air damper to open beyond the minimum position, the force produced by the diaphragm portion 53 will be balanced by the tension of spring 56, and the lever 51 will cause the valve lever 44 to assume the intermediate position. Valves 35 and 38 are thus both closed.

If the outside temperature increases, the thermostat 70 will increase the pressure applied to the diaphragm portion 53 thus causing the tension of spring 56 to be overcome for rotating the lever 51 in the counter-clockwise direction. This in turn will rotate the valve lever 44 in the clockwise direction for opening the supply valve 30.

This will permit air under pressure to flow into the motor diaphragm thus rotating the motor lever arm 17 in the clockwise direction against the action of spring 24 for thus opening the fresh air damper 7 and closing the return air damper 12. As this action occurs the spring 56 will gradually increase in tension thus tending to force the lever arms 51 and 44 back to the neutral position. It will be apparent that when the lever arm 17 rotates to the proper position for the value of pressure applied to the diaphragm portion 53 by the thermostat, the valve lever 44 will be returned entirely to the neutral position for causing the dampers to remain stationary. Upon decrease in temperature at thermostat 70 this thermostat will decrease the pressure applied to the diaphragm portion 53 thus permitting the spring 56 to rotate the lever 51 clockwise which permits rocking of lever 44 in the counter-clockwise direction by its biasing spring 47, this action causing opening of vent valve 35 for relieving air from the motor diaphragm. This will permit the spring 24 to rotate the motor lever arm 17 counter-clockwise for closing the fresh air damper 7 and opening the return air damper 12. As this action occurs the spring 56 will be reduced in tension thus causing the levers 51 and 44 to return to their neutral positions when the movement of the motor corresponds to the change in temperature at the thermostat 70.

From the description thus far it will be apparent that the thermostat 70 controls the positive positioner which in turn controls the supply and vent valves for the damper motor in a manner to insure that the motor assumes the exact position called for by the thermostat, so long as this position is beyond the minimum open position. If the thermostat 70 attempts to close the damper beyond the minimum position as determined by the pressure applied to diaphragm portion 60 by the graduate switch 75, the valve lever 44 will be prevented from rocking in the clockwise direction due to engagement with the abutment screw 65 of the lever arm 61. At this time the pressure applied to the diaphragm portion 60 will just balance the tension of spring 66 and the lever arm 61 will maintain the valve lever 44 in neutral position. It should be noted that as the thermostat continues to decrease the pressure applied to the diaphragm portion 53 the lever arm 51 will merely be rotated clockwise by spring 56 thus causing the abutment screw 54 to completely disengage valve lever 44. Thus when the thermostat attempts to close the fresh air damper beyond the minimum position, the lever arm 51 no longer controls the position assumed by the valve lever 44.

At this time the minimum position may be varied by adjustment of the graduate switch 75. Thus if the graduate switch is adjusted for increasing the pressure applied to the diaphragm portion 60 it will rotate the lever arm 61 against the action of spring 66 thus rotating the valve lever 44 clockwise for opening the air supply valve 38, thus causing the motor lever arm 17 to rotate counter-clockwise for increasing the opening of fresh air damper 7. As the damper is shifted in this direction the tension of spring 66 is increased for returning the valve levers 61 and 44 to their neutral positions when the damper position corresponds to the setting of the graduate switch 75.

It should be noted that as the thermostat 70 causes the fresh air damper to open beyond the minimum position as determined by graduate switch 75, the tension of spring 66 will overcome the pressure applied to the diaphragm portion 60 thereby causing clockwise rotation of the lever arm 61 which disengages the abutment screw 65 from lever arm 44. Consequently at this time, the minimum position control has no effect whatever upon the position of the damper which is now solely under the control of the thermostat 70. Consequently adjusting of the graduate switch 75 to vary the minimum position has no effect upon the damper position so long as the thermostat causes the damper to be opened beyond the desired minimum.

If it is desired to control the fresh air damper manually the three-way valve 69 is adjusted so as to vent the diaphragm chamber 28. This venting of diaphragm chamber 28 will permit the spring 56 to rotate the lever 51 clockwise thus causing the abutment screw 54 to disengage the valve lever 44 at all times. Therefore with the three-way valve 69 in this position, the graduate switch 75 is the sole controller for the fresh air damper and this switch may be actuated for securing any damper position between completely closed and wide open.

While the positive positioner described above is of a special utility for controlling fresh air dampers where a minimum position type of control is desired, its utility is not limited to applications of this type and it may be applied to any pneumatic or pressure responsive control system where it is desired to control a device in accordance with more than one condition. For example, as shown in Figures 4, 5, and 6 this device may be used for controlling the steam valve of a unit ventilator in a manner to prevent the discharge temperature from falling below a predetermined value.

Referring to Figure 4, this figure shows diagrammatically a unit ventilator having a casing 100 provided with the usual fans 101 and a heating coil 102. This heating coil 102 is supplied with heating medium through a supply pipe 103 and the flow of heating medium is controlled by a diaphragm type valve 104, this valve having applied thereto a positive positioner 105 which is controlled by a discharge thermostat 106 and by a space thermostat 107.

The valve 104 is provided with a diaphragm cage 108 which supports a diaphragm 109, this diaphragm being covered by a cover member 110. The diaphragm 109 is secured in a suitable manner to the valve stem 111 and a spring 112 is provided for biasing the valve stem 111 and the diaphragm 109 upwardly.

The positive positioner 105 is similar to the positive positioner previously described and accordingly is not described here in detail. This positioner includes the valve lever 112 which controls an air supply valve 113 and a vent valve 114. The lever 112 is formed in the same manner as the lever 44 of Figure 2 and is biased in the direction for opening the supply valve 113 by a spring 115. This lever is contacted by an abutment screw 116 attached to the lever arm 117 which lever arm is secured to a shaft 118 pivoted between brackets 119 and 120. Lever arm 117 also carries an abutment screw 121 which engages the diaphragm portion 122. The shaft 118 is attached to a lever arm 123 which in turn is attached to a spring 124. This spring 124 is secured to an adjusting screw 125 carried by a slider 126 mounted upon a bell crank lever 127 which is pivoted at 128 and which engages the diaphragm 109. It will be apparent that by this arrangement the tension of spring 124 is varied in accordance with the valve position, the tension being increased as the valve closes.

The valve lever 112 is also arranged to be actuated by an abutment screw 130 carried by a lever arm 131 having an abutment screw 132 engaging a diaphragm portion 133. The lever 131 is secured to a shaft 134 pivoted between brackets 120 and 135, this shaft having attached thereto a lever 136 to which is attached a spring 137 which is adjusted in accordance with the valve position in the same manner as the spring 124.

The diaphragm portion 133 covers a diaphragm chamber which is connected to the thermostat 107 by pipe 138. The diaphragm chamber beneath diaphragm portion 122 however is connected by a capillary tube 139 to the control bulb 106 which contains a volatile fluid. This causes the pressure applied to the diaphragm portion 122 to vary in accordance with the discharge temperature. When the discharge temperature is above the setting of the low limit discharge thermostat as determined by the adjustment of screw 125, the pressure applied to the diaphragm portion 122 will overcome the tension of spring 124 thereby rotating the lever 117 clockwise as seen in Figure 5 for causing the abutment screw 116 to completely disengage the valve lever 112. This leaves the control of the valve lever 112 with the lever 131 which is controlled by thermostat 107. If the space temperature increases, the thermostat 107 will increase the pressure applied to diaphragm portion 132 which rotates the lever arm 131 in the direction for permitting rotation of valve lever 112 counter-clockwise by its biasing spring 115 thus opening the supply valve 113. This permits air under pressure to be applied to the top of diaphragm 109 thus forcing the valve stem 111 downwardly for closing the valve. As the valve closes the tension of spring 137 will be increased which returns the levers 131 and 112 to the neutral position when the valve movement corresponds to the change in temperature. It will be apparent that upon decreasing the temperature the opposite action will occur for causing the valve to be opened an increased amount proportionate to the decrease in temperature.

However, if the discharge temperature should fall below the setting of the discharge thermostat 106 the pressure applied to diaphragm portion 122 will fall to such a value that the spring 124 causes rotation of lever 117 counter-clockwise thus rocking lever 112 clockwise for opening vent valve 114. This will vent air from above diaphragm 109 thus permitting the valve to open an increased amount, this opening movement causing increase in tension of spring 124 which returns the valve lever 112 to the neutral position when the valve assumes the proper position for maintaining the discharge temperature at the desired value.

It will be apparent that by adjusting the position of slider 126 on the bell crank lever 127 the differential of the limit control apparatus may be varied as desired while adjustment of the screw 125 will vary the control point of this limit control apparatus. It will be understood that the spring 137 is provided with a similar adjusting arrangement so that the control of the valve by the thermostat 107 may be independently adjusted.

From the foregoing description, it will be apparent that the present invention provides a positive positioning or follow-up control device for a controlling motor, which controls the motor independently in accordance with a plurality of conditions, the motor assuming the position corresponding to the condition demanding the greatest movement in a predetermined direction and not be influenced in such position by changes in value of the other conditions. While the invention is of particular utility in controlling fresh air dampers in air conditioning systems, it is not limited thereto but can be utilized to advantage for many other applications. As many changes and applications which are within the scope of the invention may be made, it is desired to be limited only by the scope of the appended claims.

I claim as my invention:

1. In a device of the character described, in combination, reversible motor means for moving a device to be controlled from one position to another, a controller for said motor means for selectively causing movement of said motor means in either direction or to cause said motor means to remain stationary, a first condition responsive means for actuating said controller, a first follow-up device actuated upon change in position of the motor means for cooperating with said first condition responsive means in actuating said controller, said first follow-up device causing the motor to assume positions corresponding to the value of the condition at said first condition responsive means, a second condition responsive means for also positioning said controller, and separate follow-up means actuated in response to movement of the motor means associated with said second condition responsive means, said second condition responsive means and its separate follow up means being capable of causing movement of said motor means in one direction independently of said first condition responsive means and its follow up device, while having no effect upon the position of the motor means when the first condition responsive means demands travel of said motor means in said one direction beyond the position demanded by said second condition responsive means.

2. In a device of the character described, in combination, reversible motor means for moving a device to be controlled from one position to another, a controller for said motor means, said controller selectively causing movement of said motor means in either direction and having a neutral position wherein the motor means remains stationary, a first condition responsive means for actuating said controller in one direction, biasing means for actuating said controller in the opposite direction, a spring arranged to be adjusted upon movement of said motor means and biasing said condition responsive means in a manner tending to cause said controller to assume the neutral position when the position of the motor means corresponds to the value of the condition, a second condition responsive means arranged for actuating said controller in said one direction and independently of said first condition responsive means, and a second spring for biasing said second condition responsive means, said second spring being adjusted by said motor means.

3. In a device of the character described, in combination, fluid pressure operated motor means for moving a device to be controlled from one position to another, control valve means for said motor means for selectively causing movement of said motor means in either direction, said control valve means having a neutral position in which said motor means remains stationary, a first pressure actuated means for actuating said control valve means in one direction, biasing means for said pressure actuated means, said biasing means being adjusted in response to movement of said motor means in a manner tending to return the control valve means to the neutral position as said motor means approaches a position corresponding to the pressure applied to said pressure actuated means, a second pressure actuated means for actuating said control valve means, and separate biasing means for said second pressure actuated means, said last mentioned biasing means being adjusted in response to movement of said motor means.

4. In a device of the character described, in combination, fluid pressure operated motor means for moving a device to be controlled from one position to another, control valve means for said motor means for selectively causing movement of said motor means in either direction, said control valve means having a neutral position in which said motor means remains stationary, means for biasing said control valve means in one direction, means including a pressure actuated means for actuating said control valve means against said biasing means while being incapable of positively actuating said control valve means in said one direction, follow-up means actuated in response to movement of said motor means for cooperating primarily with said pressure actuated means in controlling said control valve means, means including a second pressure actuated means for actuating said control valve means against its biasing means and being incapable of positively actuating said control valve means in said one direction, and a second follow-up means adjusted in response to movement of said motor means for cooperating primarily with said second pressure actuated means.

5. In a device of the character described, in combination, reversible motor means for moving a device to be controlled from one position to another, a controller for said motor means for selectively causing movement of said motor means in either direction, said controller having a neutral position in which said motor means remains stationary, means for biasing said controller in one direction, means including a condition responsive device for actuating said controller against said biasing means while being incapable of positively actuating said controller in said one direction, follow-up means actuated in response to movement of said motor means for cooperating primarily with said condition responsive device in actuating said controller, means including a second condition responsive device for actuating said controller against its biasing means and being incapable of positively actuating said controller in said one direction, and a second follow-up means adjusted in response to movement of said motor means for cooperating primarily with said second condition responsive device.

6. In a system of the class described, in combination, a fresh air damper for an air conditioning system, motor means for actuating said damper, a controller for said motor means, said controller selectively causing movement of said damper towards open or closed position and having a neutral position wherein the damper remains stationary, means for biasing said controller in one direction, means including a first condition responsive device for actuating said controller against said biasing means and being incapable of positively actuating said controller in the opposite direction, follow-up means actuated in response to movement of said motor means for cooperating primarily with said condition responsive device in actuating said controller, means including a second condition responsive device for actuating said controller against its biasing means and being incapable of positively actuating said controller in said one direction, a second follow-up means adjusted in response to movement of said motor means for cooperating primarily with said second condition responsive device, and means for adjusting the condition to which said second condition responsive device is subjected to thereby adjust the limit position of said damper.

7. In a system of the class described, in combination, a fresh air damper for an air conditioning system, fluid pressure operated motor means for actuating said damper, control valve means for controlling the supply and exhaust of air to and from said motor means, said control valve means having a neutral position wherein the motor means remains stationary, means for biasing said control valve means in one direction, means including a first pressure actuated device for actuating said control valve means against said biasing means and being incapable of positively actuating said control valve means in the opposite direction, means for automatically varying the pressure applied to said first pressure actuated device in accordance with the value of a condition in accordance with which said damper is being controlled, follow-up means actuated in response to movement of said motor means for cooperating primarily with said first pressure actuated device in actuating said control valve means, means including a second pressure actuated device for actuating said control valve means against its biasing means and being incapable of positively actuating said control valve means in said one direction, a second follow-up means adjusted in response to movement of said motor means for cooperating primarily with said second pressure actuated device, and means for adjusting the pressure applied to said second pressure actuated device.

8. In a system of the class described, in combination, a controlled device, fluid pressure operated motor means for actuating said controlled device, control valve means for controlling the supply and exhaust of air to and from said motor means, said control valve means having a neutral position wherein the motor means remains stationary, means for biasing said control valve means in one direction, means including a first pressure actuated device for actuating said control valve means against said biasing means and being incapable of positively actuating said control valve means in the opposite direction, means for automatically varying the pressure applied to said first pressure actuated device in accordance with variations in a condition, follow-up means actuated in response to movement of said motor means for cooperating primarily with said first pressure actuated device in actuating said control valve means, means including a second pressure actuated device for actuating said control valve means against its biasing means and being incapable of positively actuating said control valve means in said one direction, a second follow-up means adjusted in response to movement of said motor means for cooperating primarily with said second pressure actuated device, and automatic means for varying the pressure applied to the second pressure actuated device in accordance with variations in a condition.

9. In a system of the class described, reversible motor means for moving a device to be controlled from one position to another, a first control member for controlling said reversible motor means, a second control member for controlling said reversible motor means, each of said control members being capable of causing movement of the motor means in one direction independently of the other, first adjusting means for adjusting said first control member, first follow up means actuated in response to movement of said motor means for cooperating primarily with said first adjusting means in positioning said first control member, second adjusting means for adjusting said second control member, and second follow up means actuated in response to movement of said motor means for cooperating primarily with said second adjusting means in positioning said second control member.

10. In a system of the class described, reversible motor means for moving a device to be controlled from one position to another, a first control member for controlling said reversible motor means, a second control member for controlling said reversible motor means, each of said control members being capable of causing movement of the motor means in one direction independently of the other, a pressure responsive device for adjusting said first control member, first follow up means comprising a spring cooperating primarily with said pressure responsive device in positioning said first control member, said first follow up means including means for varying the stress of said spring in response to movement of said motor means, adjusting means for adjusting said second control member, and second follow up means actuated in response to movement of said motor means for cooperating primarily with said last mentioned adjusting means in positioning said second control member.

11. In a system of the class described, reversible motor means for moving a device to be controlled from one position to another, a first control member for controlling said reversible motor means, a second control member for controlling said reversible motor means, each of said control members being capable of causing movement of the motor means in one direction independently of the other, a pressure responsive device for adjusting said first control member, first follow up means comprising a spring cooperating primarily with said pressure responsive device in positioning said first control member, said first follow up means including means for varying the stress of said spring in response to movement of said motor means, adjusting means for adjusting said second control member, and second follow up means comprising a second spring cooperating primarily with said last mentioned adjusting means in positioning said second control member, and means for varying the stress on said second spring in response to movement of said motor means.

12. In a system of the class described, reversible motor means for moving a device to be controlled from one position to another, a controller for controlling said reversible motor means in a manner to cause operation of the motor means in either direction or to remain stationary, means for biasing said controller in one direction, a first control member for urging said controller against its biasing means, said first controller being normally incapable of urging said controller in the opposite direction, a pressure actuated device for adjusting the position of said first control member, first follow up means actuated in response to movement of the motor means for cooperating primarily with said pressure actuated device in determining the position of said first control member, a second control member for urging said controller against its biasing means and being normally incapable of positively moving said controller in the opposite direction, adjusting means for adjusting the position of said second control member and second follow up means actuated in response to movement of the motor means for cooperating primarily with said last mentioned adjusting means in determining the position of said second control member.

JOHN L. HARRIS.